United States Patent
Hoffmann et al.

(10) Patent No.: US 9,906,367 B2
(45) Date of Patent: Feb. 27, 2018

(54) END-TO-END TAMPER PROTECTION IN PRESENCE OF CLOUD INTEGRATION

(71) Applicants: Frank Oliver Hoffmann, Wieslock (DE); Christian Becker, Neulussheim (DE)

(72) Inventors: Frank Oliver Hoffmann, Wieslock (DE); Christian Becker, Neulussheim (DE)

(73) Assignee: SAP SE, Walldorf (DE)

(*) Notice: Subject to any disclaimer, the term of this patent is extended or adjusted under 35 U.S.C. 154(b) by 42 days.

(21) Appl. No.: 14/451,645

(22) Filed: Aug. 5, 2014

(65) Prior Publication Data

US 2016/0043868 A1    Feb. 11, 2016

(51) Int. Cl.
*H04L 29/06* (2006.01)
*H04L 9/32* (2006.01)
(Continued)

(52) U.S. Cl.
CPC ......... *H04L 9/3247* (2013.01); *G06Q 20/027* (2013.01); *G06Q 20/0855* (2013.01);
(Continued)

(58) Field of Classification Search
CPC ...... G06Q 20/027; G06Q 20/10; G06Q 20/40; G06Q 20/401; G06Q 20/0855;
(Continued)

(56) References Cited

U.S. PATENT DOCUMENTS

| | | | | |
|---|---|---|---|---|
| 5,794,234 | A | * | 8/1998 | Church ............... G06F 17/2264 |
| 6,609,200 | B2 | * | 8/2003 | Anderson ............... G06F 17/24 |
| | | | | 705/67 |

(Continued)

OTHER PUBLICATIONS

Besimi, Adrian, and Zamir Dika. "Web services middleware application: a solution for SMEs towards B2B framework implementation." Proceedings of the 10th WSEAS international conference on Applied computer and applied computational science. World Scientific and Engineering Academy and Society (WSEAS), 2011.*

(Continued)

*Primary Examiner* — Michael Simitoski
(74) *Attorney, Agent, or Firm* — Fish & Richardson P.C.

(57) ABSTRACT

The present disclosure involves systems and methods for providing end-to-end tamper protection in a cloud integration environment. One example method includes receiving, at a receiver in a cloud-based integration scenario, a B2B communication from a sender including data associated with a business transaction, the received communication in a target format. The cloud-based integration system transforms the original communication in a source format into the target format of the receiver. A digitally-signed sender fingerprint of critical fields extracted from the set of data associated with the at least one business transaction in the source format of the original B2B communication are received and verified as signed by the sender. A receiver fingerprint in the target format is generated using the critical fields from the received communication based on a predefined algorithm. The sender fingerprint and the generated receiver fingerprint are compared to determine if they are identical.

21 Claims, 4 Drawing Sheets

(51) Int. Cl.
- *G06Q 20/10* (2012.01)
- *G06Q 20/40* (2012.01)
- *H04L 29/08* (2006.01)
- *G06Q 20/02* (2012.01)
- *G06Q 20/08* (2012.01)

(52) U.S. Cl.
CPC ............ *G06Q 20/10* (2013.01); *G06Q 20/40* (2013.01); *G06Q 20/401* (2013.01); *H04L 63/08* (2013.01); *H04L 63/0823* (2013.01); *H04L 63/102* (2013.01); *H04L 63/12* (2013.01); *H04L 63/123* (2013.01); *H04L 67/28* (2013.01)

(58) Field of Classification Search
CPC ... H04L 9/3247; H04L 63/0823; H04L 63/12; H04L 63/123; H04L 63/126; H04L 67/28; H04L 63/102; H04L 63/08; G06F 21/64; G06F 17/2264; G06F 17/2247; G06F 9/546; G06F 21/645
See application file for complete search history.

(56) References Cited

U.S. PATENT DOCUMENTS

| | | | |
|---|---|---|---|
| 6,889,260 B1* | 5/2005 | Hughes | G06F 17/30569 707/E17.006 |
| 7,062,470 B2* | 6/2006 | Prasad | G06Q 20/382 705/64 |
| 7,257,647 B2* | 8/2007 | Katz | G06F 17/2247 707/999.1 |
| 7,447,707 B2* | 11/2008 | Gaurav | G06Q 20/14 |
| 7,555,462 B2* | 6/2009 | Dutta | G06Q 20/04 705/39 |
| 7,562,041 B2* | 7/2009 | Chehade | G06Q 10/087 705/37 |
| 7,627,754 B2* | 12/2009 | Tsunoda | G06F 21/64 713/161 |
| 7,653,876 B2* | 1/2010 | Ethier | G06F 17/218 715/249 |
| 7,680,945 B2 | 3/2010 | Hoffmann et al. | |
| 7,685,208 B2* | 3/2010 | Gaurav | G06F 17/2247 707/802 |
| 7,725,819 B2* | 5/2010 | Fenton | G06F 17/28 713/168 |
| 7,801,825 B2* | 9/2010 | Kranzley | G06Q 20/02 380/281 |
| 7,895,349 B2 | 2/2011 | Hoffmann et al. | |
| 8,347,277 B2* | 1/2013 | Pai | G06F 9/44589 717/140 |
| 8,458,582 B2* | 6/2013 | Rogers | G06F 17/227 705/26.4 |
| 8,543,508 B2* | 9/2013 | Katzin | G06Q 20/027 705/44 |
| 8,560,853 B2* | 10/2013 | De Mello | G06F 21/64 713/176 |
| 8,595,344 B2 | 11/2013 | Bhatt et al. | |
| 8,620,989 B2* | 12/2013 | Eisner | G06F 9/546 709/201 |
| 8,656,453 B2* | 2/2014 | Punnoose | H04L 63/20 705/1.1 |
| 8,661,107 B2 | 2/2014 | Hoffmann et al. | |
| 8,800,020 B1* | 8/2014 | Dale | H04L 9/3263 713/175 |
| 8,838,737 B2* | 9/2014 | Eisner | G06F 9/546 709/217 |
| 8,897,820 B2* | 11/2014 | Marovets | H04W 4/14 455/418 |
| 8,914,809 B1* | 12/2014 | Cohen | H04L 51/066 719/313 |
| 8,949,706 B2* | 2/2015 | McCabe | G06Q 10/10 713/179 |
| 2001/0018739 A1* | 8/2001 | Anderson | G06F 17/24 713/176 |
| 2002/0029201 A1* | 3/2002 | Barzilai | G06F 21/6245 705/80 |
| 2002/0040359 A1* | 4/2002 | Green | G06F 17/2785 |
| 2002/0040431 A1* | 4/2002 | Kato | G06F 21/6209 713/168 |
| 2002/0044662 A1* | 4/2002 | Sowler | H04L 9/3247 380/277 |
| 2002/0049906 A1* | 4/2002 | Maruyama | G06Q 20/027 713/176 |
| 2002/0062262 A1* | 5/2002 | Vasconi | G06Q 10/06 705/26.25 |
| 2002/0099735 A1* | 7/2002 | Schroeder | G06F 17/2247 715/239 |
| 2002/0144154 A1* | 10/2002 | Tomkow | H04L 12/5875 726/1 |
| 2002/0184170 A1* | 12/2002 | Gilbert | G06Q 30/06 706/20 |
| 2003/0065623 A1* | 4/2003 | Corneil | G06Q 20/382 705/64 |
| 2004/0024720 A1* | 2/2004 | Fairweather | G06F 8/427 706/46 |
| 2004/0123111 A1* | 6/2004 | Makita | G06F 21/6209 713/176 |
| 2004/0148508 A1* | 7/2004 | Alev | G06F 21/64 713/180 |
| 2004/0199876 A1* | 10/2004 | Ethier | G06F 17/218 715/249 |
| 2005/0015600 A1* | 1/2005 | Miyazaki | G06F 21/64 713/176 |
| 2005/0044197 A1* | 2/2005 | Lai | G06Q 10/10 709/223 |
| 2005/0063545 A1* | 3/2005 | Fujimoto | G06F 21/64 380/277 |
| 2005/0172131 A1* | 8/2005 | Nakayama | H04L 9/3247 713/176 |
| 2005/0193202 A1* | 9/2005 | Gajjala | H04L 9/3247 713/170 |
| 2005/0223412 A1* | 10/2005 | Nadalin | G06F 21/6209 726/3 |
| 2005/0226240 A1 | 10/2005 | Hoffmann et al. | |
| 2005/0273772 A1* | 12/2005 | Matsakis | G06F 8/41 717/136 |
| 2006/0106941 A1* | 5/2006 | Singhal | H04L 67/2823 709/238 |
| 2006/0161780 A1* | 7/2006 | Berryman | G06F 21/64 713/176 |
| 2006/0173985 A1* | 8/2006 | Moore | G06F 17/3089 709/223 |
| 2007/0005786 A1* | 1/2007 | Kumar | G06F 8/67 709/230 |
| 2007/0061579 A1* | 3/2007 | De Mello | H04L 63/123 713/176 |
| 2007/0165625 A1* | 7/2007 | Eisner | G06F 9/546 370/389 |
| 2008/0222049 A1* | 9/2008 | Loomis | G06Q 20/10 705/75 |
| 2008/0256364 A1* | 10/2008 | Chang | G06F 21/606 713/189 |
| 2009/0049062 A1* | 2/2009 | Chitrapura | G06F 17/30896 |
| 2009/0077104 A1* | 3/2009 | Sheets | G06F 21/64 |
| 2009/0106402 A1* | 4/2009 | Varmaraja | G06Q 30/0601 709/220 |
| 2009/0254971 A1* | 10/2009 | Herz | G06Q 10/10 726/1 |
| 2010/0082993 A1* | 4/2010 | Benameur | H04L 9/3247 713/176 |
| 2010/0268952 A1* | 10/2010 | Chung | H04L 9/3236 713/170 |
| 2012/0089534 A1 | 4/2012 | Liebig et al. | |
| 2012/0102171 A1 | 4/2012 | Bhatt et al. | |
| 2012/0116782 A1* | 5/2012 | Punnoose | H04L 63/20 705/1.1 |
| 2013/0095864 A1* | 4/2013 | Marovets | H04W 4/14 455/466 |

(56) References Cited

U.S. PATENT DOCUMENTS

| | | | | |
|---|---|---|---|---|
| 2013/0117400 A1* | 5/2013 | An | ................... | H04L 63/0823 709/206 |
| 2013/0132718 A1* | 5/2013 | Agrawal | ............... | H04L 9/3268 713/158 |
| 2013/0246280 A1* | 9/2013 | Kirsch | ................... | G06Q 20/14 705/71 |
| 2014/0047513 A1* | 2/2014 | van 't Noordende | .. | G06F 21/44 726/4 |
| 2014/0074968 A1 | 3/2014 | Fildebrandt | | |
| 2014/0136961 A1* | 5/2014 | Mai | ................... | G06F 17/2264 715/249 |
| 2014/0244451 A1* | 8/2014 | Mayer | .............. | G06Q 20/40145 705/30 |
| 2015/0248714 A1* | 9/2015 | Slocum | ................. | G06Q 30/04 705/34 |

OTHER PUBLICATIONS

Cho, Kwang Moon. "XML security model for secure information exchange in e-commerce." Computational Science and Its Applications-ICCSA 2006. Springer Berlin Heidelberg, 2006. 1003-1011.*

Hammar, Karl. "Orders From the Cloud: Business Integration as a Service." (2009).*

Kravitz, Jeff. "SDML-signed document markup language." Financial Services Technology Consortium, W3C Note Jun. 19, 1998.*

Rifaieh, Rami, and Nabila-Aïcha Benharkat. "An Analysis of EDI Message Translation and Message Integration Problem." Proceedings of the CSITeA-03 (2003).*

* cited by examiner

END-TO-END TAMPER PROTECTION IN PRESENCE OF CLOUD INTEGRATION

TECHNICAL FIELD

The present disclosure relates to computer-implemented methods, software, and systems for providing end-to-end tamper protection in a cloud integration environment.

BACKGROUND

Organizational units such as companies, organization, financial institutes, and public authorities run joined business processes between their application systems. These systems are located in the local information technology (IT) landscapes and are connected via an integration middleware. This integration middleware may be local to the IT landscapes, and manages the data exchange for the related business-to-business (B2B) communication. For receivers of such communication, the integrity of the data must be ensured for tamper protection, while a legally binding signature of the sender must be attached for non-repudiation. A legally binding signature in this context may represent an electronic signature, which can be accepted as evidence by a court in legal proceedings.

Existing systems provide both tamper protection and non-repudiation using asymmetric security protocols. In those instances, the sender creates the B2B data as the receiver expects it. When sending the data, the sender's integration middleware transform the data into a format suitable for the receiver. The sender can then digitally sign the B2B data and send the signed data to the receiver. The receiver then verifies the signature using the asymmetric security to verify the received data.

Due to the introduction of cloud-based integration systems, current local integration middleware has become obsolete. In cloud-based integration systems, the sender and receiver application systems are connected directly to a cloud integration system, which takes over the data transformation from the sender to receiver format.

B2B data is exchanged in very deep nested hierarchal and complex data structures, and may combine multiple records and transactions in a single message or correspondence. Many B2B standards exist, for example, AS2 (Applicability Standard 2), EDIFACT (Electronic Data Interchange For Administration, Commerce and Transport), RNIF (Rosetta-Net Implementation Framework), ISO20022 (ISO payment exchange), and others.

SUMMARY

The present disclosure relates to computer-implemented methods, software, and systems for providing end-to-end tamper protection in a cloud integration environment. One example method includes receiving, at a receiver in a cloud-based integration system, a B2B communication from a sender including data associated with a business transaction, the received communication in a target format. The cloud-based integration system transforms the original communication in a source format into the target format of the receiver. A digitally-signed sender fingerprint of critical fields extracted from the set of data associated with the at least one business transaction in the source format of the original B2B communication are received and verified as signed by the sender. A receiver fingerprint in the target format is generated using the critical fields from the received communication based on a pre-defined algorithm. The sender fingerprint and the generated receiver fingerprint are compared to determine if they are identical.

While generally described as computer-implemented software embodied on non-transitory media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

The present disclosure provides solutions for maintaining end-to-end tamper resistance and non-repudiation in a cloud-based integration system. In cloud-based integration systems, the sender and receiver application systems are connected to the cloud integration system, which (1) performs the data transformations from the sender's format to the receiver's format previously performed by local integration middleware and (2) delivers the transformed data from the cloud-based integration system to the receiver application system. Due to the data transformation in the cloud integration system, however, the sender's signature (applied at the sender application system) becomes invalid as the data is intentionally changed when applying the data transformations. The data can be signed again by the cloud-based integration system—however, such signing is considered to be performed by a different legal entity, therefore removing the end-to-end legally binding signature of prior systems. This removes the ability of the receiver to confirm that the end-to-end communication provided both tamper protection and non-repudiation. In such systems, senders may be able to claim that the data received by the receiver was not sent by the sender. Since this deficiency significantly increases the business risks for the receiver, the adoption of cloud-based integration systems for executing joined, or end-to-end, business processes is hindered. The present disclosure provides several tools for returning the availability of receiver tamper protection and non-repudiation.

Integration middleware has allowed for the integration of applications running on different computer systems in a distributed manner. Inter-organizational links between application systems, called business-to-business (B2B) integrations, are used to run one or more joined business process between multiple organizations or entities. For B2B integration, the application systems are technically not linked directly, but instead by integration middleware installed at either the sender, the receiver, or on both systems.

To run a joined business process, the exchange of business relevant data belonging to the business process is necessary. This business data is critical with respect to security requirements, since the data leaves as a file, a message, a request, or other technical representations from the sender's IT landscape and could be corrupted during the transport via the technical connectivity. In order to detect tampered data and to prevent the processing of tampered data, various technologies are used. In this context the approach of asymmetric cryptography, especially the digital signing of the business data, provides one solution. To create a digital signature on the sender's side and to verify the signature on the receiver's side, a trust relationship, or a "trustship," between the sender and the receiver is necessary. In many instances, the technical trustship is created by the a priori exchange of public keys or certificates between sender and receiver. For purposes of this application, such a trustship is referred to as an "end-to-end trust-ship." Concurrently, both the sender and received must have a technical trustship between their respective application systems and the integration middleware. Several technologies exist to establish this technical trustship, which mainly is based on authentication and authorization capabilities. This trustship is referred to as an "internal trustship" within this disclosure. In cases where data transformation occurs by or inside the integration middleware, the business data can be signed with the sender's private key again, because this internal trustship exists.

In some cases, the asymmetric, digital signing of data is performed in the sender application system's integration middleware while the whereas the signature verification is executed in the receiver application's integration middleware. Data, once it is signed, must not be changed anymore since this would break and invalidate the signature. In prior solutions, this implied that the sender application system converted the data into the receiver's format before the signature is created.

With the appearance of integration middleware in the cloud, our the cloud-based integration discussed above, the trustship picture has changed significantly. Specifically, cloud-based integration can take over the integration capabilities previously performed by the integration middleware in both the sender and receiver application systems. This includes, but is not limited to, data transformation functions, or mappings. That is, the cloud-based integration system can map the sender's data from the sender's format to the expected data format of the receiver. For tamper protection purposes, the sender application system can still sign the data, but the signature will be invalidated in the cloud-based integration system because the mapping occurs after the original data is signed, thereby invalidating the original signature. In other words, only a first trustship between the sender application system and the cloud-based integration system and a second trustship between the cloud-based integration system and the receiver application system is achieved, as the data remains unchanged only between those two communication paths. This type of trustship is referred to as a "peer-to-peer trustship" herein.

This peer-to-peer trustship is insufficient to run the joined business process because the end-to-end trustship described above is not available. This creates two issues for executing the joined business processes, namely, neither non-repudiation nor tamper protection are guaranteed. With regard to non-repudiation, the receiver is not able to legally prove that the data received was identical, or at least semantically identical, to the data sent by the sender, because the data transformed at the cloud-based integration system does not include the sender's digital signature. In cases where the sender repudiates having sent the received data, the receiver might be faced with business damages. Second, current systems cannot guarantee tamper protection. Even with the highest precautions, malicious persons may corrupt the exchanged data, either during transmission from the sender to the cloud-based integration system, at the cloud-based integration system, or during the transmission from the cloud-based integration system to the receiver. Since the end-to-end trustship and associated digital signature is not available, senders and receivers have to fully rely on the tamper protection of the peer-to-peer trustships, where such trustships have a potential gap in security where the data is mapped and then signed by the cloud-based integration system. Manipulations and modifications to the data could happen in the cloud integration system without the receiver having an ability to evaluate and detect such changes.

The present disclosure describes concepts and tools addressing both issues by re-introducing an end-to-end trustship in systems using a cloud-based integration system. In situations where the sender application system and the receiver application system use the same standard and same version according to the same message implementation, no mapping may be required at the cloud-based integration system, and thereby the digital signature may remain, valid, and verifiable. The normal, and more likely case, however, is that the sender and receiver formats do not match and need to be transformed from the sender's first format to the receiver's second format. Thus, any digital signature applied to the original data is destroyed when the cloud-based integration system maps the data to the receiver's format. The present solution considers that, for particular messages, a set of key business semantics can typically be expressed by some limited number of fields within the original data. The fields of a B2B standard which express these key business semantics of the data exchanged may be considered "critical fields." These fields can be predefined and agreed upon, so that the sender, the cloud-based integration system, and the receiver can perform the operations necessary to map the sent data as normal as well as verify a subset of critical fields at the receiver's system—that is, by extracting those critical fields at the sender application system, normalizing them into a particular agreed-upon format, and digitally signing them with the sender's digital signature. The digitally-signed subset can then be passed to the receiver application system without modification, allowing the receiver application system to validate these critical fields to allow for both non-repudiation and ensured tamper protection.

The cloud-based integration system provides a capability to define critical fields for an arbitrary B2B standard, and can be adjusted individually for specific sender-receiver groups. While illustrated and described as a cloud-based system, the integration system can be defined and implemented anywhere, including an on-premise, on-demand, or hybrid system, among others. The critical fields may appear multiple times in a nested B2B data structure and can relate to different records or rows in the exchanged data. These records or sub-parts of the exchanged data are called "segments." The solution provided herein can include a de-normalization of the hierarchical structure of critical fields and tools to correlate the multiple sets of critical fields to the multiple segments of the exchanged data. For correlation of critical fields to records of the B2B data, a correlation ID can be introduced to assist in confirming and ensuring non-repudiation and tamper protection. In one example, the critical fields are selected so that the core semantics of the underlying business process is included. The critical field values can then be normalized, so that the normalized values of the critical fields and the correlation ID can be transformed into a predefined structure, or "fingerprint." In some instances, multiple fingerprints may be created for a data exchange after the structure de-normalization. The fingerprints can be signed individually by the sender and forwarded by the cloud-based integration system to the receiver. The digital signature of the fingerprints can use a specified security protocol, such as pkcs 7, Pretty Good Privacy (PGP), or XML Signature.

In some instances, the cloud-based integration system may provide a way to transport the fingerprints from the sender application system to the receiver application system, in addition to the business data itself. In instances, the fingerprints may be sent via an alternative, or different, method than the business data. For example, fingerprints may be provided directly from the sender to the receiver through a dedicated connection, via email, or any other suitable method.

The cloud-based integration system can specify a rule set for data transformations which can be applied to the fingerprinted business data. These rules include, among others, whether and how mapping of the structure of the data is allowed, whether and how value mapping of non-critical fields is allowed, whether and how value mapping and modification of critical fields is allowed (i.e., mapping and modification of these fields is only allowed if the normalized values calculated by sender and receiver will stay the same), and whether and how splits of exchanged data are allowed if the fingerprint stays with the related business data segment. Once the receiver reads the incoming data, the receiver executes one or more verification steps. In one example, the signature of the received fingerprint(s) is verified according to the specification of the used security protocol. If the verification of the signature fails, the related business data segment is assessed as being potentially tampered and should not be processed further. Otherwise, if the signature verification succeeds, the receiver shall compute the fingerprint based on the received data (segment) again and according to the same predefined rules as the sender application system used when generating the fingerprint. The receiver-computed fingerprint is called the "receiver fingerprint," whereas the sender-computed fingerprint is called the "sender fingerprint." If the receiver fingerprint is equal to the sender fingerprint, the data (segment) is considered to be correct and not tampered, and the business process is executed at the receiver's systems. Should the comparison fail, the execution shall stop and appropriate exception handling shall be triggered to create a possible security incident. The receiver application system can log the data and verification results for non-repudiation auditing cases.

Figure 1:
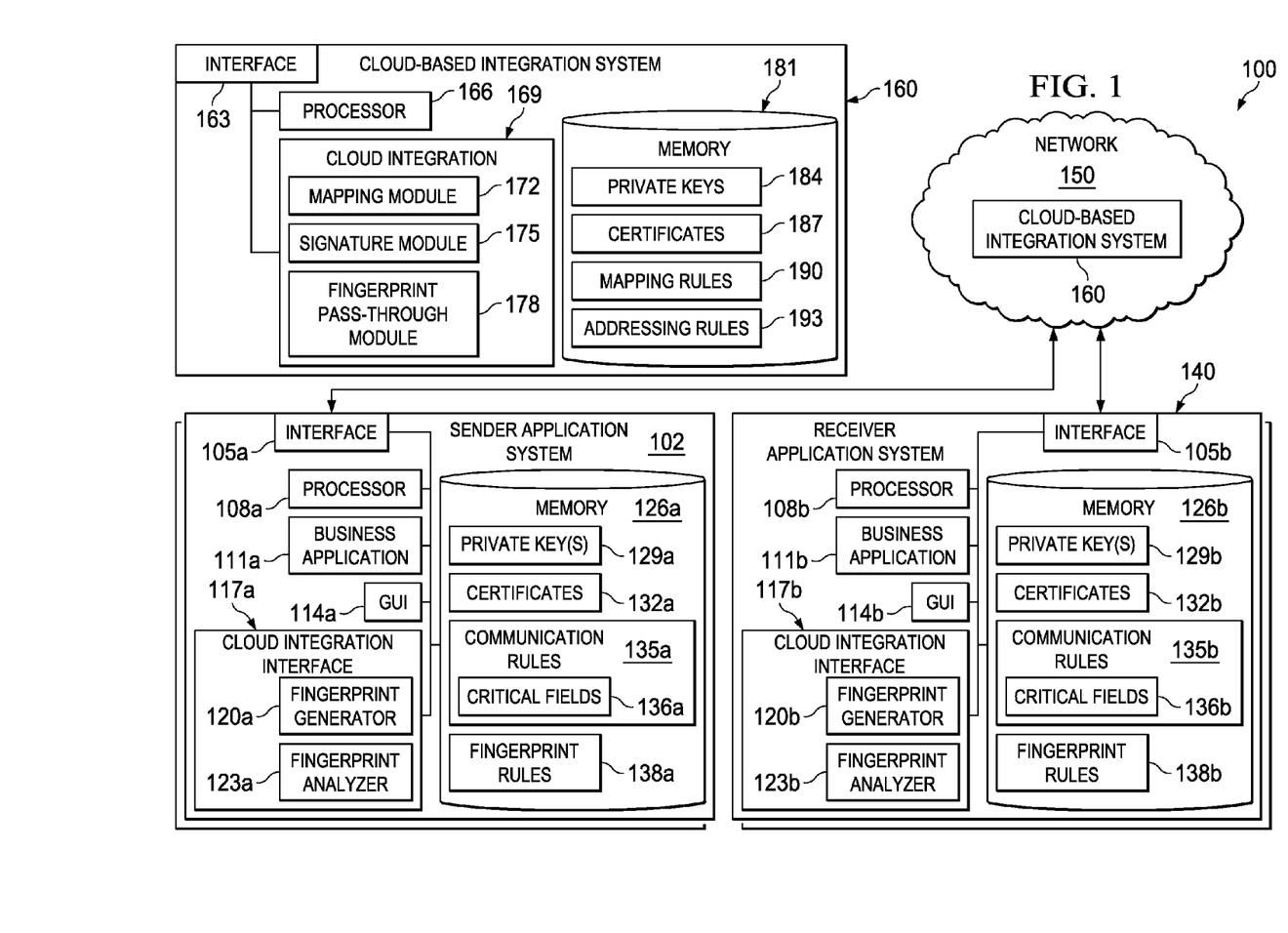
FIG. 1 is a block diagram illustrating an example system for providing end-to-end tamper protection in a cloud integration environment.

FIG. 1 is a block diagram illustrating an example system 100 for providing end-to-end tamper protection in a cloud integration environment. Although components are shown individually, in some implementations, functionality of two or more components, systems, or servers may be provided by a single component, system, or server. Similarly, in some implementations the functionality of one illustrated component, system, or server may be provided by multiple components, systems, or servers.

As illustrated in FIG. 1, system 100 includes or is communicably coupled with a sender application system 102 (or sender 102), a network 150 including a cloud-based integration system 160), and a receiver application system 140 (or receiver 140). The sender 102 and receiver 140 may be any computing devices operable to connect with one another using network 150 and the cloud-based integration system 160 using a wireline or wireless connection. In general, the sender 102 and receiver 140 comprise electronic computer devices operable to receive, transmit, process, and store any appropriate data associated with the environment 100 of FIG. 1. Sender 102 and receiver 140, can each execute a business application 111a and 111b used to perform an end-to-end operation, or a joined business process. As illustrated, the sender 102 and receiver 140 may include identical components, while each specifically referred to as either a sender and receiver, may both either send or receive business data, as needed or required by the joined business process. Multiple senders 102 and receivers 140 may be present in various implementations. In the illustration, the sender and receiver components are references as 1XXa for components shown in the sender 102 and 1XXb for components shown in the receiver 140. In the following description, the components are references without the "a" or "b" for ease of reading. A person of skill will understand that components used within a particular implementation of the sender 102 may differ from those of the receiver 140 in the same implementation.

The illustrated sender 102 and receiver 140 includes interfaces 105, processors 108, graphical user interfaces (GUIs) 114, business applications 111, memory 126, and cloud integration interfaces 117. The interfaces 105 are used by the sender 102 and receiver 140 for communicating with other systems in a distributed environment—including within the environment 100—connected to the network 150, namely, the cloud-based integration system 160, as well as other systems communicably coupled to the network 150. Generally, the interfaces 105 comprise logic encoded in software and/or hardware in a suitable combination and operable to communicate with the network 150. More specifically, the interface 105 may comprise software supporting one or more communication protocols associated with communications such that the network 150 or interface's hardware is operable to communicate physical signals within and outside of the illustrated environment 100.

As illustrated in FIG. 1, the sender 102 and receiver 140 include processors 108. Although illustrated as individual processors 108 in FIG. 1, two or more processors may be used according to particular needs, desires, or particular implementations of the environment 100 in either or both of the sender 102 and receiver 140. Each processor 108 may be a central processing unit (CPU), an application specific integrated circuit (ASIC), a field-programmable gate array (FPGA), or another suitable component. Generally, the processors 108 execute instructions and manipulate data to perform the operations of the sender 102 and receiver 140. Specifically, the processors 108 execute the functionality required to execute the sender 102 and receiver 140 generally, as well as the respective business applications 111 and cloud integration interface 117, including the functionality for sending and receiving business data and messages to each other via the cloud-based integration system 160.

Further, the illustrated sender 102 and receiver 140 include graphical user interfaces (GUI) 114. The GUIs 114 can interface with at least a portion of the environment 100 for any suitable purpose, including generating a visual representation of a Web browser and/or the business applications 111. In particular, the GUIs 114 may be used to view and navigate various Web pages located both internally and externally to environment 100, as well as to view and navigate through business data and processes associated with the business applications 111. The GUIs 114 associated with each system may comprise a GUI operable to, for example, allow the user of sender 102 to interface with at least a portion of the cloud-based integration system 160 and its associated operations and functionality, as well as other applications. Generally, the GUI 114 provides the particular user with an efficient and user-friendly presentation of business data provided by or communicated within the system. The GUI 114 may comprise a plurality of customizable frames or views having interactive fields, pull-down lists, and buttons operated by the user.

The sender 102 and receiver 140 each include memory 126, or multiple memories 126. The memory 126 may include any memory or database module and may take the form of volatile or non-volatile memory including, without limitation, magnetic media, optical media, random access memory (RAM), read-only memory (ROM), removable media, or any other suitable local or remote memory component. The memory 126 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the sender 102 and receiver 140. Additionally, the memory 126 may include any other appropriate data, such as VPN applications, firmware logs and policies, firewall policies, a security or access log, print or other reporting files, as well as others. In some instances, memory 126 can store information associated with one or more private keys 129, public key certificates 132, communication rule sets 135, and fingerprint rules 128, among others.

The private keys 129 and public key certificates 132 can be used to perform the cryptographic functionality described in the system. When the sender 102 or its components send data to the cloud-based integration system 160 or the receiver 140, the reader 102 (or its components) can sign the data with a private key 129 associated with the sender 102. The receiving component, either the cloud-based integration system 160 or the receiver 140, can use a corresponding public key (located in a valid certificate 132) to verify the digital signature and thereby, the signed data. Similarly, when fingerprints as described above are generated, the sender 102 can sign the fingerprint using the appropriate private key 129. The signed fingerprint can be provided to the receiver 140, where the unmapped and unchanged signed fingerprint can be verified and compared to the fingerprint generated independently at the receiver 140.

Memory 126 can include a set of communication rules 135 representing an agreed-to set of rules governing communications between the sender 102 and receiver 140. As part of the agreement, the critical fields 136 relevant to certain types of communications can be included therein. The critical fields 136, as described above, are defined as a bilateral agreement between sender 102 and receiver 140. In some instances, the critical fields 136 can be defined via a multilateral agreement between one sender 102 and multiple receiver 140 (i.e., the sender 102 can dictate the critical field set), multiple senders 102 and one receiver 140 (the receiver 140 can dictate the critical field set), or between multiple senders 102 and receivers 140 (e.g., as defined by an industry or de-facto standard). In some implementations, the selection of the critical fields can be based on the following criteria: (1) the fields express the essential data of a business document—i.e., the fields cover the core semantic business document; (2) the fields are contained in all supported structures in a way allowing value normalization; (3) value mapping of critical fields' values is not necessary or is prohibited (i.e., the values are not changed during mapping); (4) the number of critical fields is significantly smaller than the total number of fields encapsulated within the business document; and (5) a customer extension field or other non-standard field is not a critical field.

The critical fields 136 can be defined manually or with system support. In manual instances, the sender 102 and/or the receiver 140 can assess the fields of a business document structure with respect to the criteria defined for the selection of critical fields (e.g., using the criteria above, and/or based on a public standard such as ISO20022 or a proprietary format where fields are already categorized and evaluated). In an example directed to financial transactions such as direct debits, the sender 102 and/or the receiver 140 could identify the debtor account number, the creditor account number, the currency, the amount, and the transaction date as critical fields. These fields (1) express the essential meaning of the financial transaction, (2) are contained in all known major public payment standards, (3) do not usually allow a value mapping as the change of the accounts, currency, or amount is prevented, (4) the resulting subset is significantly smaller than the business document (e.g., up to 1:100), and (5) all fields are not customer extension fields.

Memory 126 further includes a set of fingerprint rules 138, where the fingerprint rules define the fingerprint generation process and algorithms for one or more types of communications. These fingerprint rules 138 can be shared at multiple senders 102 and receivers 140 to ensure that various messages and communications can be validated in cloud-based integration scenarios.

The illustrated sender 102 and receiver 140 each include business application 111. In general, the business applications 111 are any types of applications that allows the sender 102 and receiver 140 to perform one or more end-to-end, or joined, business processes on a single or distributed system of computers. In some instances, the business applications 111 may be an email application, a web application, applications related to one or more of Enterprise Resource Planning (ERP), Customer Relationship Management (CRM), Supply Chain Management (SCM), Supplier Relationship Management (SRM), Asset Management, Accounting, and other business and enterprise applications/systems. In some instances, the business applications 111 are involved in a business-to-business application and share information across company or system lines.

In the illustrated FIG. 1, the business applications 111 operate closely with the cloud integration interfaces 117, respectively. The cloud integration interfaces 117 provide functionality allowing the business applications 111 to communicate via the cloud-based integration system 160. While shown separate from the business applications 111, the cloud integration interfaces 117 may be included within or a part of either or both of the illustrated business applications 111. The cloud integration interfaces 111 perform many of the operations described herein, which may include extracting critical fields from a B2B communication between the sender 102 and receiver 140, normalizing the extracted fields and field values to create common fingerprints, signing with fingerprints, transporting the signed fingerprints, verifying received fingerprints, comparing the verified sender fingerprint with newly generated receiver fingerprint at the receiver 140, and performing operations associated with sending the message itself and associated fingerprint between the sender 102 and receiver 140.

The cloud integration interfaces 117, as illustrated, include a fingerprint generator 120 and a fingerprint analyzer 123. The fingerprint generator 120 can perform various operations to generate a fingerprint at the sender 102 prior to sending the fingerprint along to the receiver 140 for verification and comparison. Additionally, the fingerprint generator 120 may be used to generate fingerprints at the receiver 140 to be used from comparison with received fingerprints. The fingerprint generator 120 can identify the communication rules 135 and critical fields 136 associated with a particular communication, using those rules to generate the proper fingerprint. In addition to identifying the critical fields 136 of a particular business document (e.g., a message, communication, transmission, etc.), the fingerprint generator 120 can perform necessary structure and value normalizations.

In some instances, business documents can transport multiple business records in the same document. The data of one business record can be spread across different hierarchy levels in the document. To be able to handle and sign the records separately, the fingerprint generator 120, or any suitable component or process, should de-normalize the document structure such that every record contains all its critical fields. In one example, a complex document may include the following critical fields after extracting these fields from the overall transaction or business document:

Payment batch A1
Execution date: 2014-01-08
Debtor account: 123
Transaction 1
   Creditor account: 345
   Amount: 10.00 $
Transaction 2
   Creditor account: 654
   Amount: 7.82 $ This structure of this data can be de-normalized, in one example, to read as follows:

Transaction 1 of batch A1
Execution date: 2014-01-08
Debtor account: 123
Creditor account: 345
Amount: 10.00 $
Transaction 2 of batch A1
Execution date: 2014-01-08
Debtor account: 123
Creditor account: 654
Amount: 7.82 $ As illustrated, the target structure (generated after the de-normalization) contains some redundant data. However, this modification makes every transaction record self-sufficient and capable of handling separately. The critical fields of an individual transaction record make up a segment. The output of the structure de-normalization operation is a sequence of segments.

Next, the fingerprint generator 120 assembles the critical fields of each segment in a defined way to create the fingerprint of the particular segment, where the creation of the fingerprints for each segment generates a sequence of segment fingerpints. As cryptographic signature algorithms are sensitive to even the smallest changes, a robust and unambiguous definition of the fingerprint structure is required, and the sender 102 and receiver 140 must be able to recreate exactly the same fingerprint from the source document and the target document. In some instances, the values of the critical fields can be normalized in a canonical representation. For example, the same date can be described by different lexical representations as "Mar. 2, 2015," "3/2/2015," or "02.03.2015." A canonical representation could be the ISO 8601 format of "2015-03-02." As mentioned, both the sender 102 and receiver 140 must agree on the same canonical representation in the fingerprint. These agreements can be included within or available from, for instance, the communication rules 135 or the fingerprint rules 138. The fingerprint generator 120 can use the appropriate rules in generating the sender fingerprint or the receiver fingerprint.

The rules for the fingerprint structure are meant to be clearly defined to avoid variances. The rules may include using a fixed character encoding (like UTF-8), clear whitespace and end-of-line delimiter rules, among others. By normalizing, the same critical fields for a particular business document will result in the same fingerprint, whether generated at the sender 102 or the receiver 140. In one implementation where an XML structure is used for the fingerprint, XML Canonicalization rules (found at http://www.w3.org/TR/xml-c14n) can be used to avoid any encoding, whitespace, or namespace differences when the document is created.

In some implementations, every segment fingerprint generated by the fingerprint generator 120 can contain a unique segment ID to prevent replay attacks. The receiver 140 can reject segments if the segment ID has already been previously processed. The segment ID can also be used to correlate the fingerprint with the original business document or business record at a later time. The segment ID can be used as, or in place of, a correlation ID described above in some instances.

Every segment fingerprint generated is then signed with the private key 129 of the sender 102. In some instances, senders 102 may have multiple private keys 129, such that the particular private key 129 chosen is an agreed-upon private key 129 for the particular business document or communication being sent. The receiver 140 can then use the appropriate corresponding public key to verify the signed fingerprint.

The result of the signing results in a sequence of signed segment fingerprints. The signature protocol can be freely selected and agreed upon, and can be included in either the communication rules 135 or the fingerprint rules 138 as appropriate. Examples for signature protocols, as described above, include XML Digital Signature, PKCS#7, and PGP. Any suitable signature algorithm can be used, including but not limited to, SHA-256/RSA or SHA/DSA, among others. The segment ID associated with a particular signed segment fingerprint can be readable outside of the signed verification, thereby allowing the cloud-based integration system 160 and/or one or more other parties to identify the segment even if unable to verify the signed segment.

The cloud integration interface 117 can then collect and transport the signed segment fingerprints at the sender 102 to the cloud-based integration system 160 for delivery to the receiver 140. In some instances, the cloud integration interface 117 may send the signed segment fingerprints directly to the receiver 140 (i.e., outside of the cloud-based integration system 160 via email or another communication method). In other instances, the signed segment fingerprints can either be included directly in, or as an attachment to, the source business document, and then transmitted to the cloud-based integration system 160. The signed fingerprints will not be modified or changed by the cloud-based integration system 160, in any event, to avoid destroying the digital signature applied by the sender.

The fingerprint analyzer 123, also part of the illustrated cloud integration interface 117, is used to analyze and verify received signed fingerprints. The fingerprint analyzer 123 can perform the operations of verifying the signature of each of the received signed fingerprints received from the current sender. Additionally, the fingerprint analyzer 123 can perform the comparison and evaluation of the newly-generated receiver fingerprint to the received sender fingerprint, thus determining whether the critical fields have been changed in transport. The fingerprint analyzer 123 may not be needed in a sender 102 where the sender 102 does not perform operations as a receiver in other implementations or in other transactions.

There may be any number of senders 102 and/or receivers 140 associated with, or external to, the environment 100. For example, while the illustrated environment 100 includes multiple senders 102 and receivers 140, alternative implementations of the environment 100 may include a single sender 102 and a single receiver 140, as well as any number of senders 102 and receivers 140, all communicably coupled to one or more of each other and/or network 150. Any number suitable to the purposes of the environment 100 may be considered. Additionally, there may also be one or more additional senders 102 and receivers 140 external to the illustrated portion of environment 100 that are capable of interacting with the environment 100 via the network 150. Further, the term "sender" and "receiver" may be used interchangeably for particular systems as appropriate without departing from the scope of this disclosure, as some or all of the senders may be receivers at one time or another, and vice versa. Moreover, while the sender 102 and/or the receiver 140 may be described in terms of each being used by a single user, this disclosure contemplates that many users may use one computer, or that one user may use multiple computers.

The illustrated senders 102 and receivers 140 are intended to encompass any suitable computing device such as a server, desktop computer, laptop/notebook computer, wireless data port, smart phone, personal data assistant (PDA), tablet computing device, one or more processors within these devices, or any other suitable processing device. At a high level, the senders 102 and/or receivers 140 comprise one or more electronic computing devices operable to receive, transmit, process, store, or manage data and information associated with the environment 100 and, in particular, the business applications 111 executing thereupon.

As used in the present disclosure, the term "computer" is intended to encompass any suitable processing device. For example, although FIG. 1 illustrates a single entity labeled sender 102 and a single entity labeled receiver 140, environment 100 can be implemented using two or more such systems, as well as computers other than servers, including a server pool. Indeed, the sender 102 and receiver 140 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the senders 102 and receivers 140 may be adapted to execute any operating system, including Linux, UNIX, Windows, Mac OS®, Java™, Android™, iOS or any other suitable operating system. According to one implementation, the sender 102 and/or the receiver 140 may also include or be communicably coupled with an e-mail server, a Web server, a caching server, a streaming data server, and/or other suitable server or computer. Similarly, the cloud-based integration system 160 may be implemented as any suitable computer, and may include two or more systems, servers, remote processors, or the like.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, JavaScript, Java™, Visual Basic, assembler, Perl®, any suitable version of 4GL, as well as others.

The network 150 facilitates wireless or wireline communications between the components of the environment 100 (i.e., between the client 102 and the communications system 150), as well as with any other local or remote computer, such as additional clients, servers, or other devices communicably coupled to network 150, including those not illustrated in FIG. 1. In the illustrated environment, the network 150 is depicted as a single network, but may be comprised of more than one network without departing from the scope of this disclosure, so long as at least a portion of the network 150 may facilitate communications between senders and recipients. In some instances, one or more of the illustrated components associated with the contextual suggestion module 114 and the semantic index 124 may be included within network 150 as one or more cloud-based services or operations. The network 150 may be all or a portion of an enterprise or secured network, while in another instance, at least a portion of the network 150 may represent a connection to the Internet. In some instances, a portion of the network 150 may be a virtual private network (VPN). Further, all or a portion of the network 150 can comprise either a wireline or wireless link. Example wireless links may include 802.11a/b/g/n, 802.20, WiMax, LTE, and/or any other appropriate wireless link. In other words, the network 150 encompasses any internal or external network, networks, sub-network, or combination thereof operable to facilitate communications between various computing components inside and outside the illustrated environment 100. The network 150 may communicate, for example, Internet Protocol (IP) packets, Frame Relay frames, Asynchronous Transfer Mode (ATM) cells, voice, video, data, and other suitable information between network addresses. The network 150 may also include one or more local area networks (LANs), radio access networks (RANs), metropolitan area networks (MANs), wide area networks (WANs), all or a portion of the Internet, and/or any other communication system or systems at one or more locations.

As illustrated, the cloud-based integration system 160 can exist, at least partially, within the network 150 as a cloud-based application or system. In general, the cloud-based integration system 160 performs at least some of the operations previously performed by local integration middleware, including translating business documents from a format associated with the sender 102 to a format associated with the receiver 140. The cloud-based integration system 160 can perform operations regarding routing, or addressing, particular business documents and related messages. In general, the cloud-based integration system 160 is a form of system integration delivered as a cloud service that can address data, process, service-oriented architecture (SOA), and application integration use cases. The cloud-based integration system 160 can facilitate the integration of business processes and data across on-premise and cloud applications (cloud-cloud and cloud-on-premise integration). Process integration capabilities allow integration of business processes spanning different companies, organizations, or departments within an organization. In one implementation, SAP's HANA Cloud Integration product can be used as the cloud-based integration system 160.

As illustrated, the cloud-based integration system 160 includes an interface 163, a processor 166, a cloud integration module 169, and memory 181. The interface 163, processor 166, and memory 181 may be similar to or different than the interface 105, processor 108, and memory 126, respectively.

As illustrated, memory 181 can include a set of private keys 184, one or more certificates 187, mapping rules 190, and addressing rules 193. The private keys 184 can be used to sign transformed business documents to ensure peer-to-peer trustship exists with the receiver 140 to whom a particular business document is being sent. The certificates 187 can be used to verify business documents and other signed information received from a sender 102, and can include the public keys necessary to verify the signed documents. By verifying the signatures from senders 102, the cloud-based integration system 160 can ensure a peer-to-peer trustship with the senders 102 as well. The mapping rules 190 can be used by the cloud-based integration system 160 to determine how the business documents must be modified from a source format of the sender 102 to a target format of the receiver 140. The addressing rules 193 can define where and how particular business documents and communications are to be sent from the cloud-based integration system 160 to the receiver 140.

The cloud integration module 169 performs the middleware integration processes between systems, companies, or organizations. The cloud integration module 169 can include a mapping module 172 capable of performing the mapping processes based on the mapping rules 190, a signature module 175 capable of performing the signing and verification processes using the private keys 184 and certificates 187 to provide peer-to-peer trustships with the other systems, and a fingerprint pass-through module 178, which allows signed fingerprints to pass through the cloud-based integration system 160 without modification. In general, the cloud-based integration system 160 can transform the source document (i.e., the business document received from the sender 102) into any suitable target document structure associated with the receiver 140, as long as the target document contains all critical fields per individual segment and the normalized values of the critical fields stay invariant during the transformation. Mapping rules 190 can be designed to ensure these requirements as appropriate. In some instances, the target document may not contain all segments from the source document, for example, due to filtering or size restrictions on the target side (i.e., at the receiver 140). The cloud-based integration system 160 can transmit only the corresponding subset of signed segment fingerprints to the receiver 140 in those instances. The proper segments to send may be determined by comparing the segment IDs associated with the sent segments to the signed fingerprints corresponding to those same segment IDs. The mapped business documents and unchanged signed fingerprints can then be provided, via network 150, to the receiver 140.

When the business documents are received at the receiver 140, the business application 111 and cloud integration interface 117 can use the fingerprint generator 120 and fingerprint analyzer 123, in combination, to evaluate the received signed fingerprint. Initially, the cryptographic signature associated with the received documents can be checked and verified with a public key corresponding to the private key used to sign the document (e.g., by a public key associated with a particular certificate 132*b* available at the receiver 140). For every segment in the target business document, several operations can be performed. First, the fingerprint generator 120 can independently generate a suitable receiver fingerprint to compare to the received signed fingerprint. The operations to do so include extracting and generating the segmented fingerprint from the target document through a process similar to the process performed at the sender 102 to generate the sender fingerprint. The receiver 140 can then compare the critical fields in the receiver segment fingerprint with the critical fields in the corresponding sender segment fingerprint, with the corresponding segments matched, for instance, by the corresponding segment IDs. If a mismatch is detected, the segment can be rejected. If the target document contains a segment without a matching sender segment fingerprint, the segment can be rejected. The receiver 140 can keep track of the successfully processed segment IDs (and, optionally, the segment signature values). If a segment ID has already been processed, the segment can be ignored and not processed again. If a segment is rejected for any reason, the receiver 140 can manually or automatically raise a security incident with the cloud-based integration system 160 and sender 102 as the business content may be potentially tampered.

In some instances, the cloud-based integration system 160, or any other intermediate point during processing, can perform similar fingerprint analyses. For example, the cloud-based integration system 160 could check the signed fingerprints after receiving the business document prior to providing the business document to the receiver 140 to detect manipulations and possible tampering during transport. In such systems, the cloud-based integration system 160 would then include one or more of a fingerprint generator, fingerprint analyzer, a set of critical field definitions, and fingerprint rules to perform such analyses and subsequent signing.

The procedures described above are designed to allow some flexibility for the cloud-based integration system 160 to filter or re-bundle segments before forwarding them to the receiver 140. This may be required due to different bundling rules of the source and target formats, as well as of the sender 102 and receiver 140. At a high level, the procedure can allow the receiver 140 to verify the business integrity of the single segments, but cannot provide assurance as to whether any segments are missing or if the order of the segments has changed. The basic procedure can thus be enhanced to protect against the deletion of segments by adding a continuously increasing sequence number to the segment fingerprint at the sender 102. The receiver 140 can track the received sequence numbers in order to detect any missing segment by checking for missing numbers in the sequence. This improvement may only allow the receiver 140 to detect missing segments as long as new messages are exchanged. An attacker could completely disrupt the message delivery without raising a security alert at the receiver 140. To remedy this, the sender 102 and receiver 140 can agree to exchange periodic checkpoint messages without business content, but with a confirmation as to the sequence numbers that should have been received. If the checkpoint message does not arrive after the agreed period of time (e.g. once per day), the receiver 140 can assume that the message delivery has been disrupted and trigger an investigation.

While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
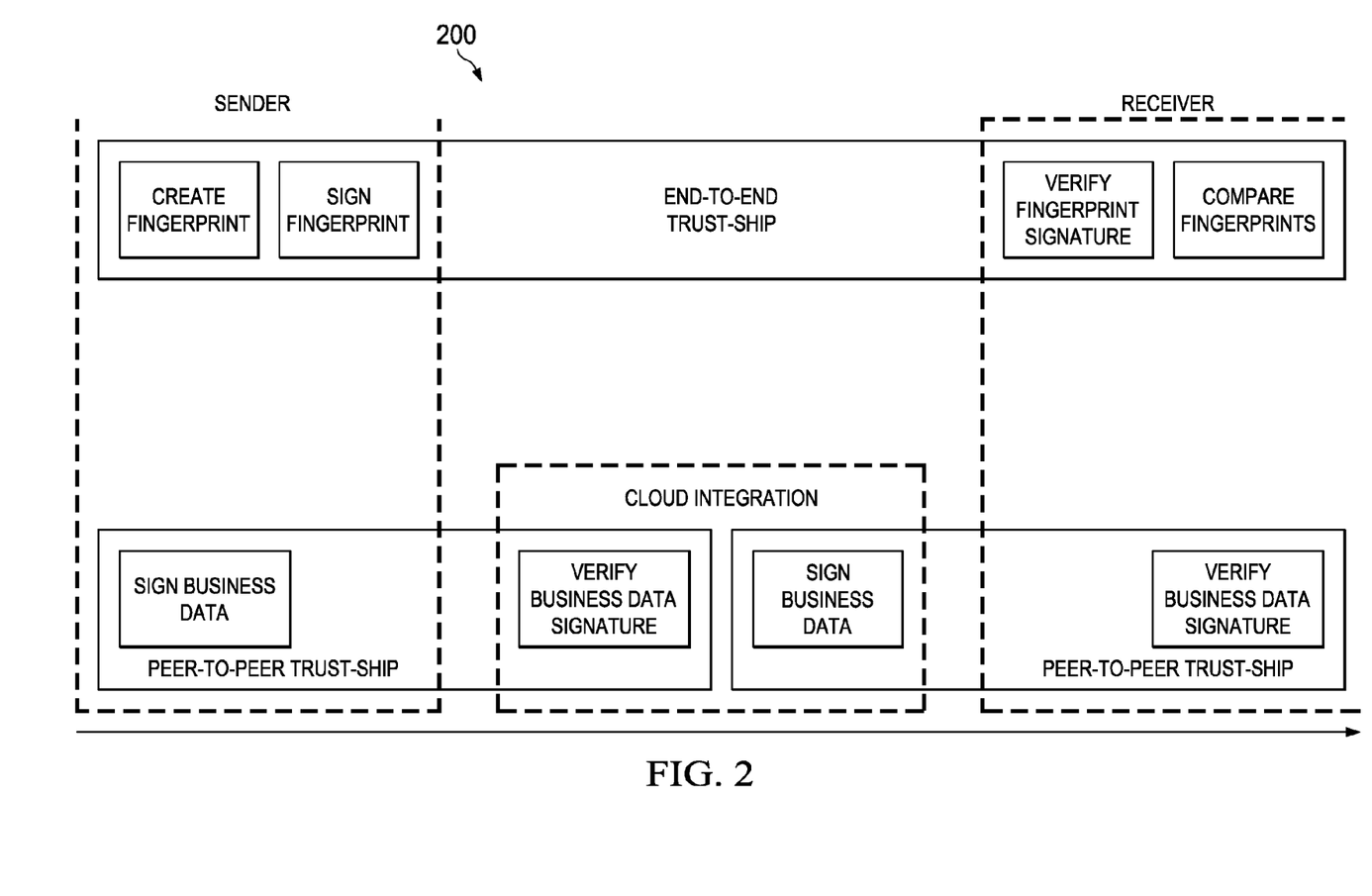
FIG. 2 is a block diagram illustrating operations performed between participants in an example system providing end-to-end tamper protection in a cloud integration environment.

FIG. 2 provides an illustration of the end-to-end trustship established using the disclosed methods, where the trustships created include a peer-to-peer trustship between the sender and the cloud-based integration system and between the cloud-based integration system and the receiver, as well as a full end-to-end trustship between the sender and receiver. In other words, the verification and comparison of the sender and receiver fingerprints using the above-reference methodology establishes the desired end-to-end trustship and allows, at the same time, the data transformations to occur within the cloud-based integration system.

Figure 3:
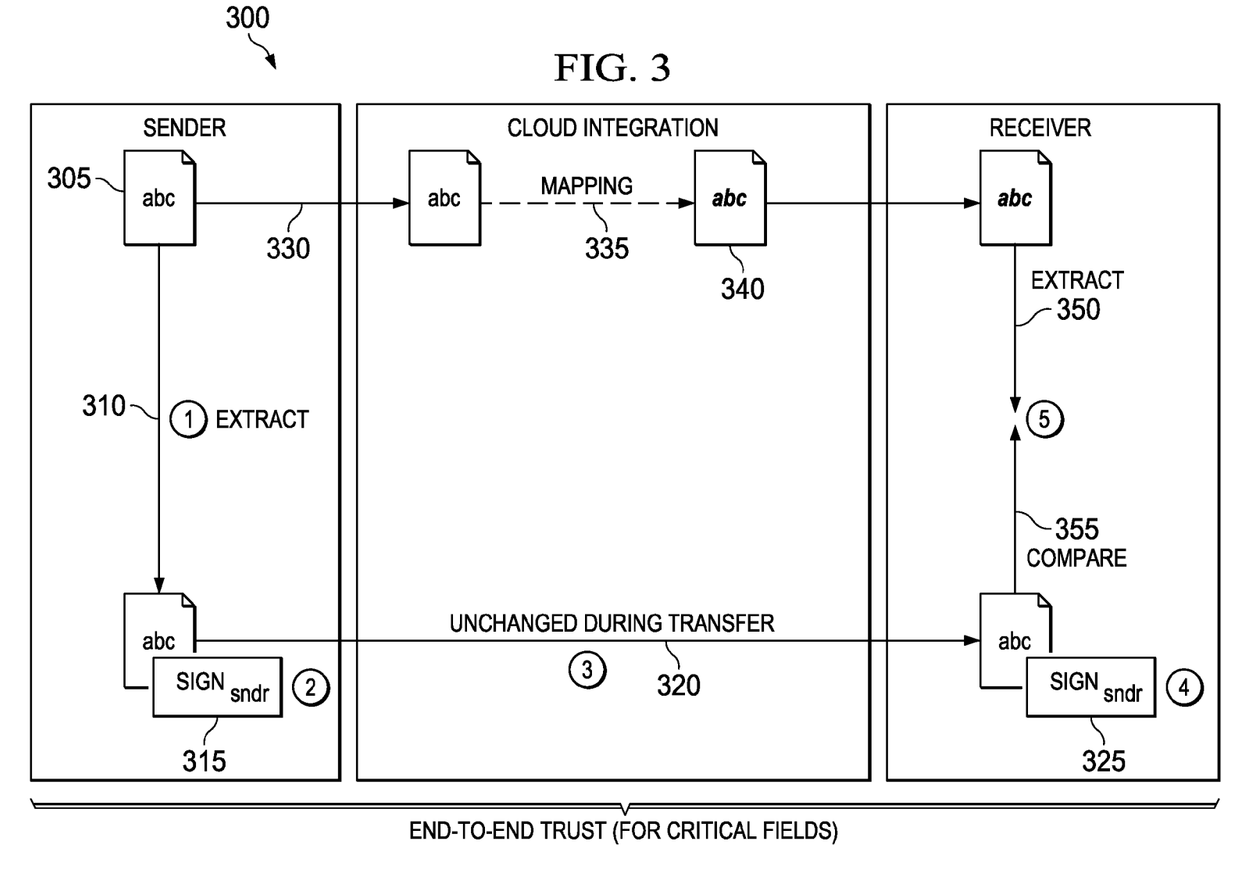
FIG. 3 is a diagram illustrating the control and data flow in a solution providing end-to-end tamper protection in a cloud integration environment.

FIG. 3 is a diagram 300 illustrating the control and data flow in a solution providing end-to-end tamper protection in a cloud integration environment. As illustrated, the implementation of the described system can provide an end-to-end trustship from the sender to the receiver with regard to the critical fields used for the signed fingerprint.

As illustrated, the sender can generate a business document 305. Arrow 310 illustrates the extraction of the predefined critical fields from the business document 305, and includes the de-normalization of the critical field's structure and values according to the agreed upon rules to generate a fingerprint of the critical fields. At 315, the fingerprint is digitally signed using the sender's private key. The signed fingerprint can be sent to the receiver for later use as shown by arrow 320, where the signed fingerprint is unchanged during the transfer.

Returning to the top of the illustration, the business document 305 is provided to the cloud integration system, where (at arrow 335) the original business document 305 (in a first format) is mapped into a second format associated with and usable by the receiver, wherein the mapping generates target document 340 within the cloud integration system. In some instances, the signed fingerprint 315 can be sent to the receiver along with the target document 340.

After receiving the target document 340 and the signed sender fingerprint, the receiver extracts the critical fields from the target document 340, while concurrently checking to confirm that the received fingerprint 325 is valid. The extracted critical fields (as shown by arrow 350), in particular their structure and values, are de-normalized according to the agreed-upon algorithm also used by the sender, and a receiver fingerprint is generated. The receiver-generated fingerprint is then compared to the sender fingerprint to confirm that the values are identical (at 355). If so, then the end-to-end trustship can be confirmed for the portions of the business document that are identical.

Figure 4:
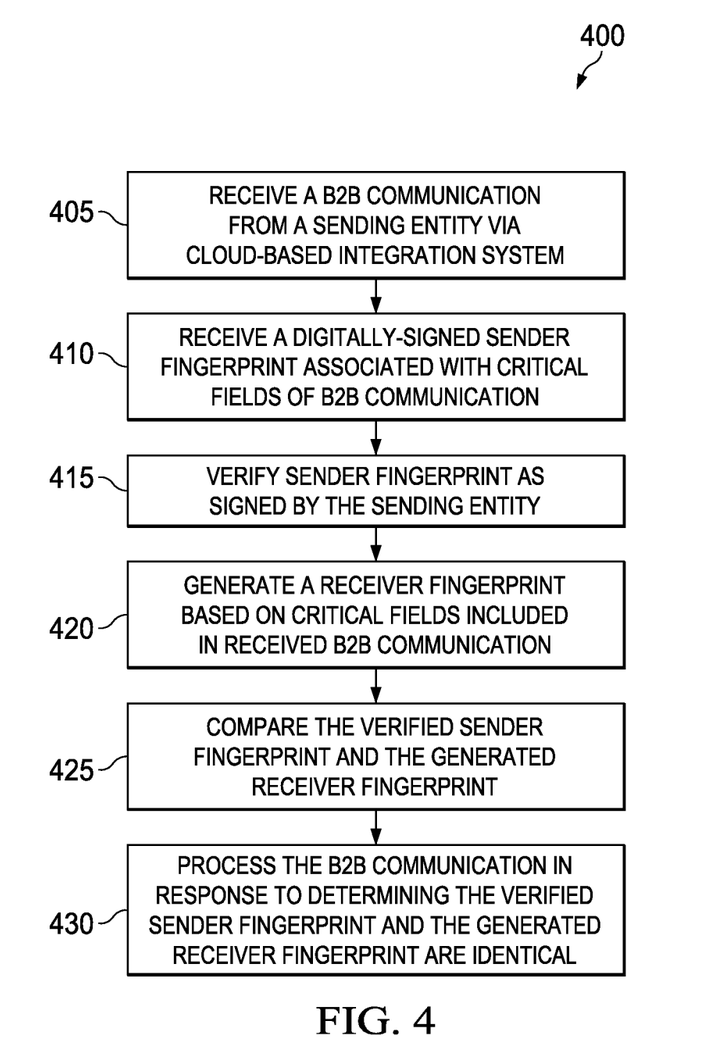
FIG. 4 is a flowchart of an example method for providing end-to-end tamper protection in a cloud integration environment.

FIG. 4 is a flowchart of an example method 400 for providing end-to-end tamper protection in a cloud integration environment. For clarity of presentation, the description that follows generally describes method 400 in the context of FIG. 1. However, it will be understood that method 400 may be performed, for example, by any other suitable system, environment, software, and hardware, or a combination of systems, environments, software, and hardware as appropriate.

At 405, a B2B communication from a sender, or sending entity, is received via a cloud-based integration system. The B2B communication can include sets of data associated with one or more business transactions, and may be received in a format suitable for the receiving entity to process. The cloud-based integration system may transform a B2B communication from a source format used at a sending entity into a target format used at the receiving entity. The transformation, or mapping, may be based on predefined rules used to allow different systems, applications, or entities communicate in performing end-to-end, or joined business processes. The source and target formats may be formats used by business applications or processes performed at the sending entity and the receiving entity, respectively. The B2B communication may include multiple business records related to one or more business transactions, and may include a plurality of fields associated with each business record. A subset of those fields may be considered critical fields. Critical fields are described above, but can be fields agreed-upon by the sending entity and the receiving entity prior to sending the current B2B communication that express the data of the business document, or that are capable of covering a core semantic to a particular business record. The critical fields should be used in a repeatable way throughout each communication such that value normalization is possible.

At 410, a digitally-signed sender fingerprint is received at the receiving entity, where the sender fingerprint is associated with the critical fields of the B2B communication. The digital signature applied to the received sender fingerprint can be applied using any suitable cryptographic methods, including public/private key cryptography. The sending entity can apply, for example, a private key associated with the sending entity at the sending entity. The fingerprint is created by extracting the agreed-upon critical fields from the B2B communication at the sending entity, de-normalizing the structure of the critical fields (e.g., as described above), and normalizing the values of one or more of the critical fields in an agreed-upon manner. The critical fields are then combined in an agreed-upon manner and digitally-signed by the sending entity. The signed sender fingerprint is then provided to the receiving entity for later use in verifying the received fingerprint.

In some instances, the signed sender fingerprint can be received via the same channel as the received B2B communication—that is, from the cloud-based integration system. In some instances, the signed sender fingerprint can be included within the B2B communication or attached to the B2B communication. In still other instances, the signed sender fingerprint can be received via a separate communication channel other than the cloud-based integration system. In some instances, the sending entity may provide the signed sender fingerprint via email or another communication method. In general, the signed sender fingerprint is meant to be unchanged from its original generation, and will not be modified by the cloud-based integration system or another communication method. The further operations in method 400 can confirm that the critical fields have not changed.

At 415, the signed sender fingerprint is verified as signed by the sending party. This verification can be performed by using a corresponding key to confirm the sending entity's digital signature. For example, where the sending entity uses a private key to sign the sender fingerprint, the receiving entity can verify the signature using a corresponding public key associated with the used private key. If the signed sender fingerprint cannot be verified, then method 400 may end or move to a new communication or record within the communication.

At 420, the receiving entity generates a receiver fingerprint based on the critical fields included in the received B2B communication. The fingerprint generation algorithm is shared by the sending entity and the receiving entity, and therefore generates identical fingerprints when the underlying critical fields are the same. The extraction algorithm used to retrieve data from the documents may be different due to different sources and target formats. Therefore, by independently generating the receiver fingerprint, the receiving entity can confirm that the critical fields of the B2B communication have not changed from their values at the sending entity if the sender and receiver fingerprint are identical. The algorithm for generating the fingerprints is predefined and common to both the sending and receiving entity. In some instances, and as described above, the algorithm includes extracting the critical fields from the B2B communication, de-normalizing the structure of the critical fields, and normalizing the values of the critical fields.

At 425, the verified sender fingerprint and the generated receiver fingerprint are compared. If the fingerprints are identical, method 400 continues at 430 where the B2B communication is process normally. However, if the fingerprints are not identical, the B2B communication is not processed at the receiving entity. In some instances, the receiving entity may report or raise an issue or error report to identify potential tampering with the communication.

The tools and operations described above can be used in various implementations. One example implementation may be between financial institutions or businesses and their banking institution, among others. In one example, a corporation may represent the sender while a bank may represent the receiver. The present solution enables (a) exchanging payments from corporations to banks and (b) payment status responses and account statements from banks to corporations. The present solution can provide high-end security measures to prevent payment manipulation. To further prevent reading by unauthorized entities, encryption can be added by one of skill in the art. The participants or cloud-based integration system can specify an agreed set of payment transaction critical fields, whose values must stay unchanged during the payment transmission from corporation to the bank. The values of the critical fields will be normalized, correlated, transformed into a fingerprint (structure), and signed by the corporation with the corporate private key before sending. The cloud-based integration system does not change the values of the critical fields, whereas the structure and format of the payment can be modified. Additionally, values of non-critical fields may be changed without invalidating the exchanged data. The receiving bank can calculate the fingerprint of the received critical fields and compare the fingerprint to the received signed fingerprint from the corporation. If both hashes are equal, then the payment will be accepted. If the hashes of the signed fingerprints are not identical, then processing can enter an error status which results in a negative payment status response message. Using this solution, the corporation and bank can establish an end-to-end trustship in addition to the standard peer-to-peer trustships. Further advantages and benefits can be found thorough use of the described solution.

The preceding figures and accompanying description illustrate example processes and computer-implementable techniques. But systems 100, 200, and 300 (or its software or other components) contemplate using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, systems 100, 200, and 300 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computerized method performed by one or more processors, the method comprising:
    receiving, at a receiving entity via a cloud-based integration system, a business-to-business (B2B) communication from a sending entity, wherein the B2B communication includes a set of data associated with at least one business transaction, where the received B2B communication is in a target format, and wherein the cloud-based integration system transforms an original B2B communication in a source format sent from the sending entity into the target format of the B2B communication received at the receiving entity;
    after receiving the B2B communication transformed by the cloud-based integration system, receiving, at the receiving entity, a digitally-signed sender fingerprint of critical fields from the sending entity, wherein the digitally-signed sender fingerprint of critical fields is received without transformation by the cloud-based integration system, wherein the critical fields are extracted by the sending entity from the set of data associated with the at least one business transaction in the source format of the original B2B communication, wherein the critical fields represent a particular subset of fields within the set of data identified and predefined by the sending entity and the receiving entity prior to the B2B communication being sent, and wherein the set of data includes the critical fields and one or more non-critical fields;
    verifying, at the receiving entity, that the received sender fingerprint was signed by the sending entity; and
    in response to verifying that the received sender fingerprint was signed by the sending entity:
        extracting, at the receiving entity, the critical fields from the received B2B communication in the target format based on a pre-defined algorithm;
        in response to extracting the critical fields from the received B2B communication, generating, at the receiving entity, a receiver fingerprint based on the extracted critical fields from the received B2B communication; and
        comparing the received sender fingerprint and the generated receiver fingerprint to determine that the received sender fingerprint and the generated receiver fingerprint are identical.

2. The method of claim 1, wherein the sender fingerprint is received via the cloud-based integration system.

3. The method of claim 2, wherein the sender fingerprint is included within the B2B communication.

4. The method of claim 1, wherein the sender fingerprint is received via a channel other than the cloud-based integration system.

5. The method of claim 1, wherein transformation of the original B2B communication from the source format to the target format is based on predefined rules.

6. The method of claim 1, wherein signing the fingerprints creates hash values calculated by applying the digital signatures.

7. The method of claim 1, wherein generating the receiver fingerprint of the received B2B communication in the target format based on the critical fields includes:
    extracting a set of critical fields from the received B2B communication; and
    de-normalizing the structure of the extracted set of critical fields based on a set of predefined normalization rules.

8. The method of claim 7, where generating the receiver fingerprint of the received B2B communication in the target format based on the critical fields further includes normalizing at least one value associated with at least one critical field based on the set of predefined normalization rules.

9. The method of claim 1, wherein the pre-defined algorithm is used by the sending entity to generate the verified sender fingerprint received by the receiving entity.

10. The method of claim 1 further comprising, in response to determining that the verified sender fingerprint and the generated receiver fingerprint are identical, processing the received B2B communication at the receiving entity.

11. The method of claim 1 further comprising, in response to determining that the verified sender fingerprint and the generated receiver fingerprint are not identical, not processing the B2B communication at the receiving entity and notifying the cloud-based integration system.

12. The method of claim 1, wherein determining that the verified sender fingerprint and the generated receiver fingerprint are identical indicates that the sender fingerprint was unchanged after signing by the sending entity.

13. The method of claim 1, wherein the critical fields represent key message semantics for verification.

14. A computing system, comprising a memory, one or more processors, and instructions stored on the memory and operable when executed by the one or more processors to cause the computing system to perform operations comprising:
    receiving, at a receiving entity via a cloud-based integration system, a business-to-business (B2B) communication from a sending entity, wherein the B2B communication includes a set of data associated with at least one business transaction, where the received B2B communication is in a target format, and wherein the cloud-based integration system transforms an original B2B communication in a source format sent from the sending entity into the target format of the B2B communication received at the receiving entity;
    after receiving the B2B communication transformed by the cloud-based integration system, receiving, at the receiving entity, a digitally-signed sender fingerprint of critical fields from the sending entity, wherein the digitally-signed sender fingerprint of critical fields is received without transformation by the cloud-based integration system, wherein the critical fields are extracted by the sending entity from the set of data associated with the at least one business transaction in the source format of the original B2B communication, wherein the critical fields represent a particular subset of fields within the set of data identified and predefined by the sending entity and the receiving entity prior to the B2B communication being sent, and wherein the set of data includes the critical fields and one or more non-critical fields;
    verifying, at the receiving entity, that the received sender fingerprint was signed by the sending entity; and
    in response to verifying that the received sender fingerprint was signed by the sending entity:
        extracting, at the receiving entity, the critical fields from the received B2B communication in the target format based on a pre-defined algorithm;
        in response to extracting the critical fields from the received B2B communication, generating, at the receiving entity, a receiver fingerprint based on the extracted critical fields from the received B2B communication; and
        comparing the received sender fingerprint and the generated receiver fingerprint to determine that the received sender fingerprint and the generated receiver fingerprint are identical.

15. The system of claim 14, wherein the pre-defined algorithm is used by the sending entity to generate the verified sender fingerprint received by the receiving entity.

16. The system of claim 14, wherein the signing the fingerprints creates hash values calculated by applying the digital signatures.

17. The system of claim 14, wherein generating the receiver fingerprint of the received B2B communication in the target format based on the critical fields includes:
    extracting a set of critical fields from the received B2B communication; and
    de-normalizing the structure of the extracted set of critical fields based on a set of predefined normalization rules.

18. The system of claim 17, wherein generating the receiver fingerprint of the received B2B communication in the target format based on the critical fields further includes normalizing at least one value associated with at least one critical field based on the set of predefined normalization rules.

19. The system of claim 14, wherein the operations further comprise, in response to determining that the verified sender fingerprint and the generated receiver fingerprint are identical, processing the received B2B communication at the receiving entity.

20. A computer program product encoded on a non-transitory storage medium, the product comprising non-transitory, computer readable instructions for causing one or more processors to perform operations comprising:
    receiving, at a receiving entity via a cloud-based integration system, a business-to-business (B2B) communication from a sending entity, wherein the B2B communication includes a set of data associated with at least one business transaction, where the received B2B communication is in a target format, and wherein the cloud-based integration system transforms an original B2B communication in a source format sent from the sending entity into the target format of the B2B communication received at the receiving entity;
    after receiving the B2B communication transformed by the cloud-based integration system, receiving, at the receiving entity, a digitally-signed sender fingerprint of critical fields from the sending entity, wherein the digitally-signed sender fingerprint of critical fields is received without transformation by the cloud-based integration system, wherein the critical fields are extracted by the sending entity from the set of data associated with the at least one business transaction in the source format of the original B2B communication, wherein the critical fields represent a particular subset of fields within the set of data identified and predefined by the sending entity and the receiving entity prior to the B2B communication being sent, and wherein the set of data includes the critical fields and one or more non-critical fields;

verifying, at the receiving entity, that the received sender fingerprint was signed by the sending entity; and in response to verifying that the received sender fingerprint was signed by the sending entity:

extracting, at the receiving entity, the critical fields from the received B2B communication in the target format based on a pre-defined algorithm;

in response to extracting the critical fields from the received B2B communication, generating, at the receiving entity, a receiver fingerprint based on the extracted critical fields from the received B2B communication; and comparing the received sender fingerprint and the generated receiver fingerprint to determine that the received sender fingerprint and the generated receiver fingerprint are identical.

21. The computer program product of claim 20, wherein generating the receiver fingerprint of the received B2B communication in the target format based on the critical fields includes:

extracting a set of critical fields from the received B2B communication;

de-normalizing the structure of the extracted set of critical fields based on a set of predefined normalization rules; and normalizing at least one value associated with at least one critical field based on the set of predefined normalization rules.

* * * * *